United States Patent
Dees et al.

(10) Patent No.: US 10,261,701 B2
(45) Date of Patent: *Apr. 16, 2019

(54) METHODS TO COMMUNICATE A TIMESTAMP TO A STORAGE SYSTEM

(71) Applicant: INTEL CORPORATION, Santa Clara, CA (US)

(72) Inventors: Brian Dees, Hillsboro, OR (US); Knut Grimsrud, Forest Grove, OR (US); Rick Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,592

(22) Filed: May 19, 2017

(65) Prior Publication Data

US 2017/0329537 A1  Nov. 16, 2017

Related U.S. Application Data

(63) Continuation of application No. 12/286,502, filed on Sep. 30, 2008, now Pat. No. 9,727,473.

(51) Int. Cl.
| | |
|---|---|
| G06F 3/06 | (2006.01) |
| G06F 1/14 | (2006.01) |
| G06F 12/0868 | (2016.01) |
| G06F 1/3287 | (2019.01) |
| G06F 9/4401 | (2018.01) |
| G06F 12/0866 | (2016.01) |

(52) U.S. Cl.
CPC ............ *G06F 3/0616* (2013.01); *G06F 1/14* (2013.01); *G06F 1/3287* (2013.01); *G06F 3/0625* (2013.01); *G06F 3/0659* (2013.01); *G06F 3/0679* (2013.01); *G06F 9/4418* (2013.01); *G06F 12/0868* (2013.01); *G06F 12/0866* (2013.01); *G06F 2212/214* (2013.01); *Y02D 10/13* (2018.01)

(58) Field of Classification Search
None
See application file for complete search history.

(56) References Cited

U.S. PATENT DOCUMENTS

| | | | |
|---|---|---|---|
| 5,297,148 | A | 3/1994 | Harari et al. |
| 5,941,989 | A | 8/1999 | Klein |
| 6,405,329 | B1 | 6/2002 | Colligan et al. |
| 6,693,888 | B2 | 2/2004 | Cafarelli et al. |

(Continued)

FOREIGN PATENT DOCUMENTS

| | | |
|---|---|---|
| JP | 2002032271 A | 1/2002 |
| JP | 2003196613 A | 7/2003 |

(Continued)

OTHER PUBLICATIONS

Abstract and Machine Translation for JP Publication No. 2002032271, dated Jan. 31, 2002, 21 pp.

(Continued)

*Primary Examiner* — Midys Rojas
*Assistant Examiner* — Khoa D Doan
(74) *Attorney, Agent, or Firm* — Compass IP Law PC

(57) ABSTRACT

Embodiments of methods to communicate a timestamp to a storage system are generally described herein. Other embodiments may be described and claimed.

30 Claims, 5 Drawing Sheets

(56) References Cited

U.S. PATENT DOCUMENTS

| | | | |
|---|---|---|---|
| 6,778,537 | B1 | 8/2004 | Ishibashi |
| 6,910,106 | B2 | 6/2005 | Sechrest |
| 6,950,255 | B2 | 9/2005 | Imai |
| 7,047,354 | B2 | 5/2006 | Yagisawa et al. |
| 7,146,464 | B2 | 12/2006 | Yagisawa et al. |
| 7,174,421 | B2 | 2/2007 | Ehrlich |
| 7,272,686 | B2 | 9/2007 | Yagisawa et al. |
| 7,275,133 | B2 | 9/2007 | Yagisawa et al. |
| 7,340,640 | B1 | 3/2008 | Karr et al. |
| 7,363,444 | B2 | 4/2008 | Ji |
| 7,366,839 | B2 | 4/2008 | Yagisawa et al. |
| 7,424,519 | B2 | 9/2008 | Hoshino et al. |
| 7,653,778 | B2 * | 1/2010 | Merry, Jr. ........... G06F 12/0246 711/103 |
| 7,925,830 | B2 | 4/2011 | Yagisawa et al. |
| 7,970,946 | B1 | 6/2011 | Djabarov et al. |
| 2003/0131068 | A1 | 7/2003 | Hoshino et al. |
| 2003/0185238 | A1 | 10/2003 | Strasser et al. |
| 2004/0001272 | A1 | 1/2004 | Imai |
| 2004/0068627 | A1 | 4/2004 | Sechrest |
| 2004/0117137 | A1 | 6/2004 | Jin |
| 2004/0162940 | A1 * | 8/2004 | Yagisawa ............. G06F 3/0607 711/114 |
| 2004/0230853 | A1 | 11/2004 | Miyamoto |
| 2005/0036512 | A1 | 2/2005 | Loukianov |
| 2005/0050275 | A1 | 3/2005 | Yagisawa et al. |
| 2005/0065984 | A1 | 3/2005 | Yagisawa et al. |
| 2005/0066078 | A1 | 3/2005 | Yagisawa et al. |
| 2005/0066126 | A1 | 3/2005 | Yagisawa et al. |
| 2005/0066128 | A1 | 3/2005 | Yagisawa et al. |
| 2005/0071525 | A1 | 3/2005 | Yagisawa et al. |
| 2005/0123137 | A1 | 6/2005 | McCallum |
| 2006/0080574 | A1 | 4/2006 | Saito et al. |
| 2006/0152981 | A1 | 7/2006 | Ryu |
| 2006/0155946 | A1 | 7/2006 | Ji |
| 2006/0271678 | A1 | 11/2006 | Jessup et al. |
| 2007/0106836 | A1 | 5/2007 | Lee et al. |
| 2007/0110027 | A1 | 5/2007 | Yeh et al. |
| 2007/0156285 | A1 | 7/2007 | Sillman |
| 2007/0245084 | A1 | 10/2007 | Yagisawa et al. |
| 2007/0260811 | A1 | 11/2007 | Merry et al. |
| 2007/0268938 | A1 | 11/2007 | Dowd |
| 2008/0126685 | A1 | 5/2008 | Danilak |
| 2008/0155183 | A1 | 6/2008 | Zhuang et al. |
| 2008/0172528 | A1 | 7/2008 | Yagisawa et al. |
| 2009/0043951 | A1 | 2/2009 | Shalvi et al. |
| 2009/0049312 | A1 | 2/2009 | Min |
| 2009/0103203 | A1 | 4/2009 | Yoshida |
| 2009/0113119 | A1 | 4/2009 | Oribe et al. |
| 2009/0195394 | A1 | 8/2009 | Johnson |
| 2009/0282301 | A1 | 11/2009 | Flynn et al. |
| 2009/0300274 | A1 | 12/2009 | Luo et al. |
| 2009/0300277 | A1 | 12/2009 | Jeddeloh |
| 2009/0307713 | A1 | 12/2009 | Anderson et al. |
| 2010/0017556 | A1 | 1/2010 | Chin et al. |
| 2010/0017640 | A1 | 1/2010 | Gallant |
| 2010/0106889 | A1 | 4/2010 | Manning |
| 2010/0122022 | A1 | 5/2010 | Luo et al. |
| 2010/0122200 | A1 | 5/2010 | Merry et al. |
| 2010/0268694 | A1 | 10/2010 | Denoue et al. |
| 2010/0275055 | A1 | 10/2010 | Edel et al. |
| 2010/0292854 | A1 | 11/2010 | Burg et al. |
| 2010/0306580 | A1 * | 12/2010 | McKean ............. G06F 12/0246 714/6.13 |
| 2011/0060927 | A1 | 3/2011 | Fillingim et al. |
| 2011/0167220 | A1 | 7/2011 | Yagisawa et al. |
| 2011/0246651 | A1 | 10/2011 | Djabarov et al. |
| 2012/0284587 | A1 * | 11/2012 | Yu ..................... G06F 3/0608 714/773 |
| 2017/0285970 | A1 * | 10/2017 | Li ..................... G06F 3/0653 |

FOREIGN PATENT DOCUMENTS

| | | |
|---|---|---|
| JP | 2004030534 A | 1/2004 |
| JP | 2004246749 A | 9/2004 |
| JP | 2004342168 A | 12/2004 |
| TW | 200719153 A | 5/2007 |
| WO | 2010039626 A2 | 4/2010 |

OTHER PUBLICATIONS

Abstract and Machine Translation of JP Publication No. 2003-196613, dated Jul. 11, 2003, 44 pp.

Abstract and Machine Translation of JP Publication No. 2004-030534, dated Jan. 29, 2004, 22 pp.

Abstract and Machine Translation of JP Publication No. 2004-246749, dated Sep. 2, 2004, 62 pp.

Abstract and Machine Translation of JP Publication No. 2004-342168, dated Dec. 2, 2004, 31 pp.

Advisory Action for U.S. Appl. No. 12/286,502, dated Jul. 3, 2014, 3 pages.

Advisory Action for U.S. Appl. No. 12/286,502, dated Oct. 7, 2015, 6 pages.

English Translation of Final Office Action 2 for KR Application No. 2011-7007288, dated Aug. 23, 2013, 2 pp.

European Office Action 2, dated Feb. 16, 2015, for Application No. 09818321.3-1953, Total 6 pp.

European Office Action for Patent Application No. 09818321.3, dated Jul. 17, 2017, 4 pages.

Final Office Action 1 for JP Application No. 2011-529297, dated Aug. 13, 2013, 8 pp.

Final Office Action 1 for KR Application No. 2011-7007288, dated Mar. 28, 2013, 2 pp.

Final Office Action for U.S. Appl. No. 12/286,502, dated Aug. 11, 2016, 13 pages.

Final Office Action for U.S. Appl. No. 12/286,502, dated Feb. 13, 2014, 10 pages.

Final Office Action for U.S. Appl. No. 12/286,502, dated Jun. 5, 2015, 12 pages.

Final Office Action for U.S. Appl. No. 12/286,502, dated Nov. 25, 2011, 10 pages.

International Preliminary Report on Patentability received for PCT Patent Application No. PCT/US2009/058533, dated Apr. 14, 2011, 6 pages.

International Search Report/Written Opinion for Patent Application No. PCT/US2009/058533, dated Apr. 30, 2010, 11 pages.

Notice of Allowance 1 for CN Application No. 200980137446.6, dated Nov. 26, 2013, 11 pp.

Notice of Allowance 1 for TW Application No. 981329812, dated Nov. 15, 2013, 3 pp.

Office Action for CN Application No. 200980137446.3, dated May 15, 2013, 11 p.

Office Action 1 for EP Application No. 09818321.3-1229, dated Aug. 1, 2012, 6 pp.

Office Action 1 for JP Application No. 2011-529297, dated Aug. 1, 2012, 6 pp. (+ Engl Trans).

Office Action 1 for KR Application No. 2011-7007288, dated Sep. 11, 2012, 6 pp. (English Translation of Action and Pending Claims).

Office Action 2 for JP Application No. 2011-529297, dated Apr. 4, 2013, 5 pp.

Office Action for U.S. Appl. No. 12/286,502, dated Apr. 19, 2011, 9 pages.

Office Action for U.S. Appl. No. 12/286,502, dated Dec. 3, 2015, 13 pages.

Office Action for U.S. Appl. No. 12/286,502, dated Jul. 15, 2013, 14 pages.

Office Action for U.S. Appl. No. 12/286,502, dated Jul. 2, 2012, 10 pages.

Office Action for U.S. Appl. No. 12/286,502, dated Nov. 6, 2014, 11 pages.

Official Letter and Search Report for TW Application No. 098132912, dated May 21, 2013, 9 pp. (with Engl. Transl. of Search Report).

(56) References Cited

OTHER PUBLICATIONS

Response to Office Action 1 for CN Application No. 200980137446.6 (w/ English Claims), dated Sep. 30, 2013, 13 pp.
Response to Office Action 1 for JP Application No. 2011-529297, dated Oct. 30, 2012, 9 pp. [with English Translation of Claims].
Response to Office Action 1 for TW Application No. 981329812 (w/ English Spec), dated Nov. 4, 2013, 48 pp.
Response to Office Action 2 for JP2011529297, dated Jul. 8, 2013, 10 pp. (with Engl. Transl. of Amended Claims).
Search Report for EP Application No. 09818321.3-1229, dated Jul. 10, 2012, 3 pp.
US Publication No. 2007/0110027, dated May 17, 2007, is an English language equivalent of TW200719153, dated May 16, 2007.

* cited by examiner

| Register | 7 | 6 | 5 | 4 | 3 | 2 | 1 | ~ 410 |
|---|---|---|---|---|---|---|---|---|
| Features | t | Reserved ||||||  ~ 420 |
| Features (exp) | Timestamp (TS) 7:0 |||||||  ~ 430 |
| Sector Count | TAG ||| Reserved |||| ~ 450 |
| Sector Count (exp) | TS 15:8 |||||||  |
| LBA Low | TS 23:16 |||||||  |
| LBA Low (exp) | TS 31:24 |||||||  |
| LBA Mid | TS 39:32 ||||||| ~ 440 |
| LBA Mid (exp) | TS 47:40 |||||||  |
| LBA High | TS 55:48 |||||||  |
| LBA High (exp) | TS 63:56 |||||||  |
| Device | Res | 1 | Res | 0 | Reserved ||||
| Command | 64h |||||||  ~ 470 |

FIG. 4

METHODS TO COMMUNICATE A TIMESTAMP TO A STORAGE SYSTEM

This application is a continuation of U.S. patent application Ser. No. 12/286,502, filed Sep. 30, 2018, and is now U.S. Pat. No. 9,727,473. The entire specification of which is hereby incorporated by reference in its entirety.

TECHNICAL FIELD

The present disclosure relates generally to the field of data processing and more particularly to methods and related apparatus for transmitting a timestamp from a platform to a storage system to manage endurance and enhance life expectancy of a solid-state memory device.

BACKGROUND

Mobile and relatively fixed platforms may include hardware resources, such as a primary circuit board to couple a central processing unit (CPU) to a clock generator, a graphics card, volatile memory such as random access memory (RAM), a flash read-only memory (ROM) or dedicated non-volatile (NV) memory space, and a high capacity non-volatile memory device such as a hard disk drive (HDD). The platform may also include software resources, such as a basic input/output system (BIOS), a virtual machine monitor (VMM), and one or more guest operating systems (OSs) running on the VMM. Alternate NV memory devices, such as on-board or removable low latency memory may be added to platforms to either replace the HDD or to complement the HDD depending on the use and form of the platform.

Cost efficient and low power platforms including servers, desktops, laptops, netbooks, mobile and other handheld devices are evolving to require minimal power consumption with reduced complexity and cost. The platforms occasionally operate in idle or powered-down states to accommodate lower power requirements.

Some solid state disks (SSD) based on NV memory devices such as NAND (not and) have endurance specifications limiting a number of program/erase cycles they can perform before their data storage characteristics degrade. To ensure that endurance limitations are not prematurely exceeded, a governing device may be applied to ensure that cycling limits are not exceeded in a specified lifetime. A mechanism for tracking relative states of the SSD to indicate how and/or when the SSD is used over its lifetime is lacking to avoid a constant power-on presumption.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is an embodiment of a command queuing formatted command used to communicate a timestamp.

Figure 1:
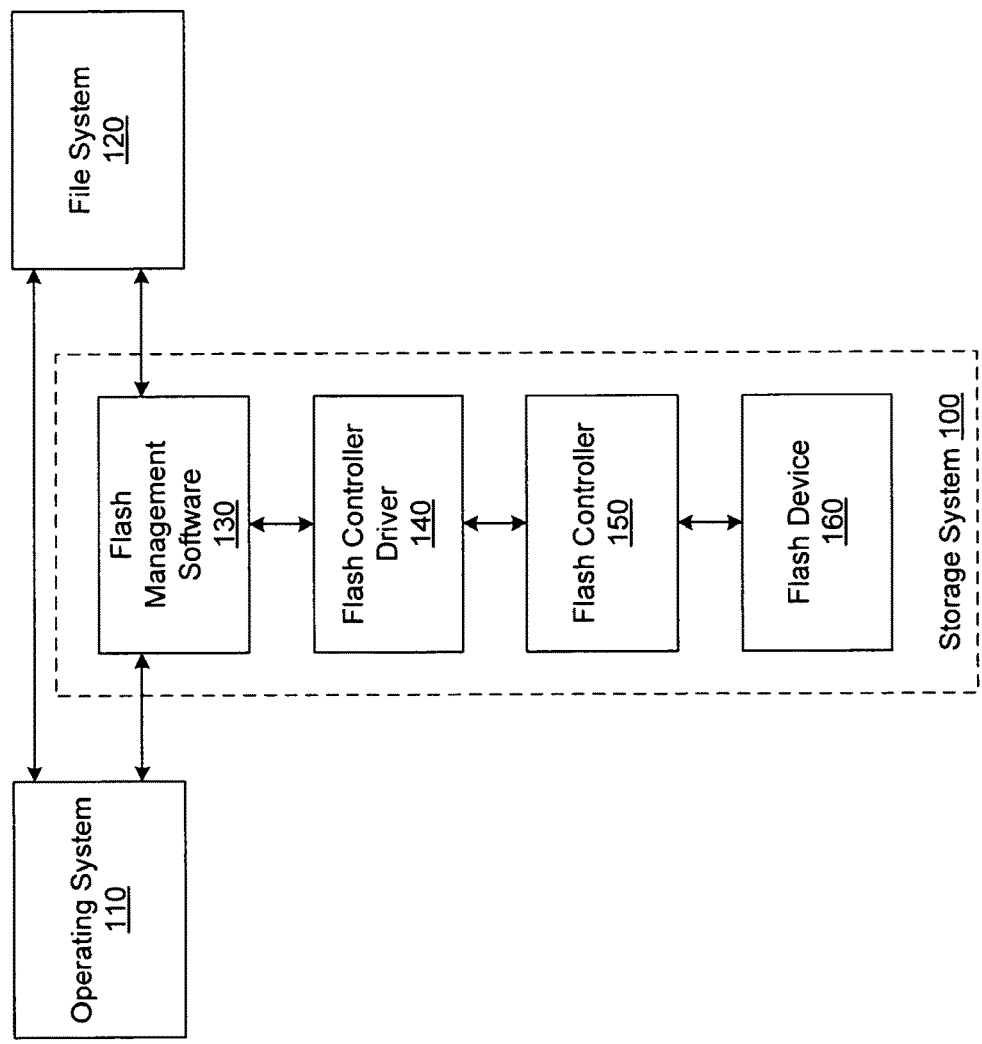
FIG. 1 is a block diagram of a storage system configured to communicate with an operating system.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for communicating a timestamp from a platform to a storage system are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to communicate a timestamp from a platform to a storage system such as a SSD, particularly in applications where the storage system is intermittently powered up and has time-related and/or usage based characteristics governing its usable life. A low cost and efficient method to provide accurate data reflecting actual usage of the storage system having memory elements may extend a service life of the storage system. Use of this data can enable the storage system to track and/or manage the rate of memory element use and/or consumption to avoid premature exhaustion of the storage system. For example, the method may inform the storage system of how much time has elapsed during periods where the storage system is in a standby or a hibernating state and/or powered-off to manage one or more consumable resources in the storage system and improve an expected lifetime of the storage system.

One such method for communicating a timestamp from a platform to a storage system may comprise identifying a storage system to receive and process a timestamp. A clock generator capable of providing a reference signal is selected and a timestamp is established in reference to the reference signal. The timestamp is written to a data packet and the data packet is transmitted to the storage system. The storage system receives the data packet with the timestamp and the timestamp is processed by the storage system. The timestamp may be a single time value and/or the timestamp may be a change in time between two time values, resulting in a time delta. The time delta may be transmitted to the storage system as a timestamp to inform the storage system of how much time has elapsed while the storage system was powered off, in hibernation, in standby mode, or otherwise idled. Data comprising a plurality of timestamps may be used to update a budget for a group of consumables to manage a storage system life and account for time when the storage system is powered off, in hibernation, idled or otherwise not in use.

FIG. 1 is a block diagram of a storage system 100 configured to communicate with an operating system 110. The operating system 110 is responsible for the management and coordination of activities and sharing of resources of a platform. The operating system 110 acts as a host for application programs that are run on the platform. A file system 120 interacts with the operating system 110 to store and organize files used by the platform for the storage, organization, manipulation, navigation, access, and retrieval of data. In this embodiment, the file system 120 also interacts with a storage system 100 through flash management software 130 for the physical storage of the files. For example, the storage system 100 may be used as a non-volatile data storage location and/or a cache storage location for quick and repeated access of the data.

The flash management software 130 provides an interface that allows the file system 120 and/or operating system 110 to interact with the storage system 100. In one embodiment, the flash management software 130 may provide a mechanism to manage bad blocks in a NAND memory array, to provide small block emulation of larger blocks, mitigate the effects of wear on a memory array through the application of wear leveling algorithms, and to provide an interface that allows interaction with the storage system 100 at a file level through a flash controller driver 140.

The flash controller driver 140 is a program that allows the flash management software 130 to interact with a flash controller 150 by acting as a translator to convert higher level commands from the flash management software 130 into lower level commands necessary for the flash controller 150. The flash controller 150 is generally used to provide read, write, and erase functionality in addition to error detection and transfer of data to and from a flash device 160. Data written to and read from the flash device 160 may be stored using one or more registers in physical locations such as memory blocks or sectors.

Alternately, the storage system 100 may be a data storage device such as a SSD that uses solid state memory to store persistent data. The SSD may emulate a hard disk drive while providing lowered access times and latency. In this embodiment (not shown), the flash management software 130 is embedded in the SSD, usually in the form of firmware running within the SSD that is transparent to a host or platform 200 of FIG. 2. Here, the firmware may serve a variety of functions including the functionality otherwise provided by the flash management software 130.

Figure 2:
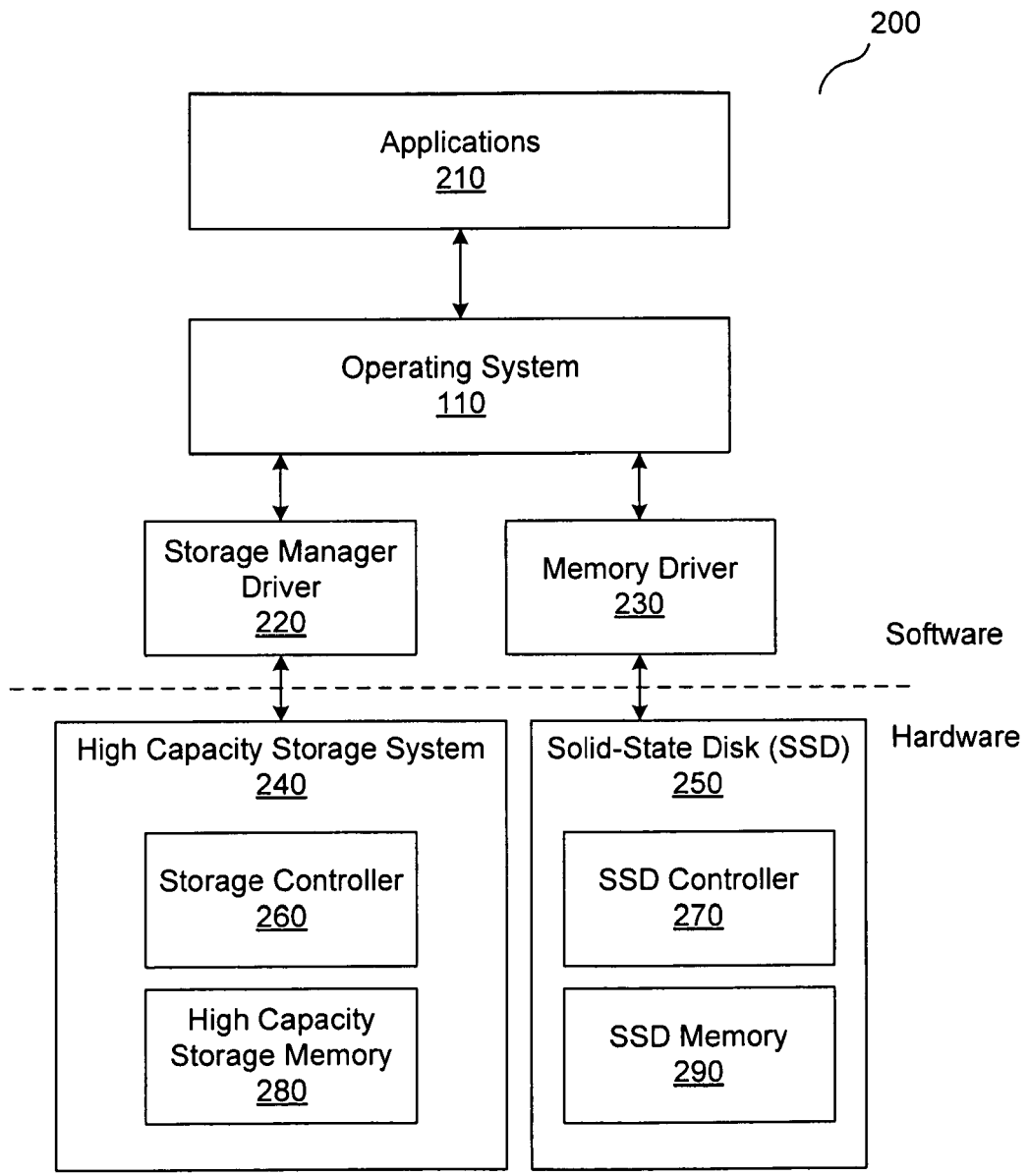
FIG. 2 is a block diagram of a high capacity storage system and a solid state disk configured to communicate with an operating system.

FIG. 2 is a logical layout of a platform 200 comprising a high capacity storage system 240, and a solid state disk (SSD) 250 that is one embodiment of the storage system 100 of FIG. 1, configured to communicate with the operating system 110. The SSD 250 may complement the high capacity storage system 240 as shown in FIG. 2. Alternatively, the SSD 250 may serve to replace and eliminate the need for the high capacity storage system 240 in another embodiment. Functionally, the operating system 110 reads and writes to and from the solid state disk 250 and the high capacity storage system 240 while interacting with one or more applications 210 that operate through the operating system 110. In one embodiment, the applications 210 may provide word processing, spreadsheet, media player, matrix storage, and one or more cryptography capabilities. The operating system 110 interacts with the high capacity storage system 240 through a storage manager driver 220, and interacts with a solid state disk 250 with or without use of a memory driver 230.

An embodiment of the high capacity storage system 240 comprising a storage controller 260 and a high capacity storage memory 280 may be a disk drive, a networked storage location, a tape drive, a floppy drive, or an optical drive such as a digital video disk (DVD) and/or compact disk (CD) reader and/or writer or combination thereof. The solid state disk 250 may be a flash based drive connected to a processor using a serial advanced technology attachment (ATA), a parallel ATA, and/or a universal serial bus (USB) interface, or an Intel® Turbo Memory connected to a processor using high speed input/output (I/O) controller hub (ICH) or platform control hub (PCH). Data may be stored in single level cell (SLC) and/or multi-level cell (MLC) format. In the alternate embodiment, the solid state disk 250 may provide read and/or write caching functionality and be designed to improve platform 200 responsiveness such as reduced boot time and/or provide power savings, for example, by replacing or substituting HDD functionality with solid state functionality.

In FIG. 2, the solid state disk 250 comprises a SSD controller 270, which may be an application specific integrated circuit controller (ASIC) device connected to an interface such as a serial ATA or an integrated drive electronics controller (not shown). The solid state disk 250 also comprises a SSD memory 290 comprising one or more NAND and/or NOR flash or phase change (PC) memory devices. In another embodiment, the solid state disk 250 may also comprise a memory driver 230 and a disk filtering option read only memory (ROM) in the form of pre-boot software to handle basic input output system (BIOS) level disk access. In a further embodiment, the solid state disk 250 may be associated with the high capacity storage system 240 by binding the solid state disk 250 to the high capacity storage system 240 of a platform 200 using an installation and/or setup matrix storage application of applications 210.

Figure 3:
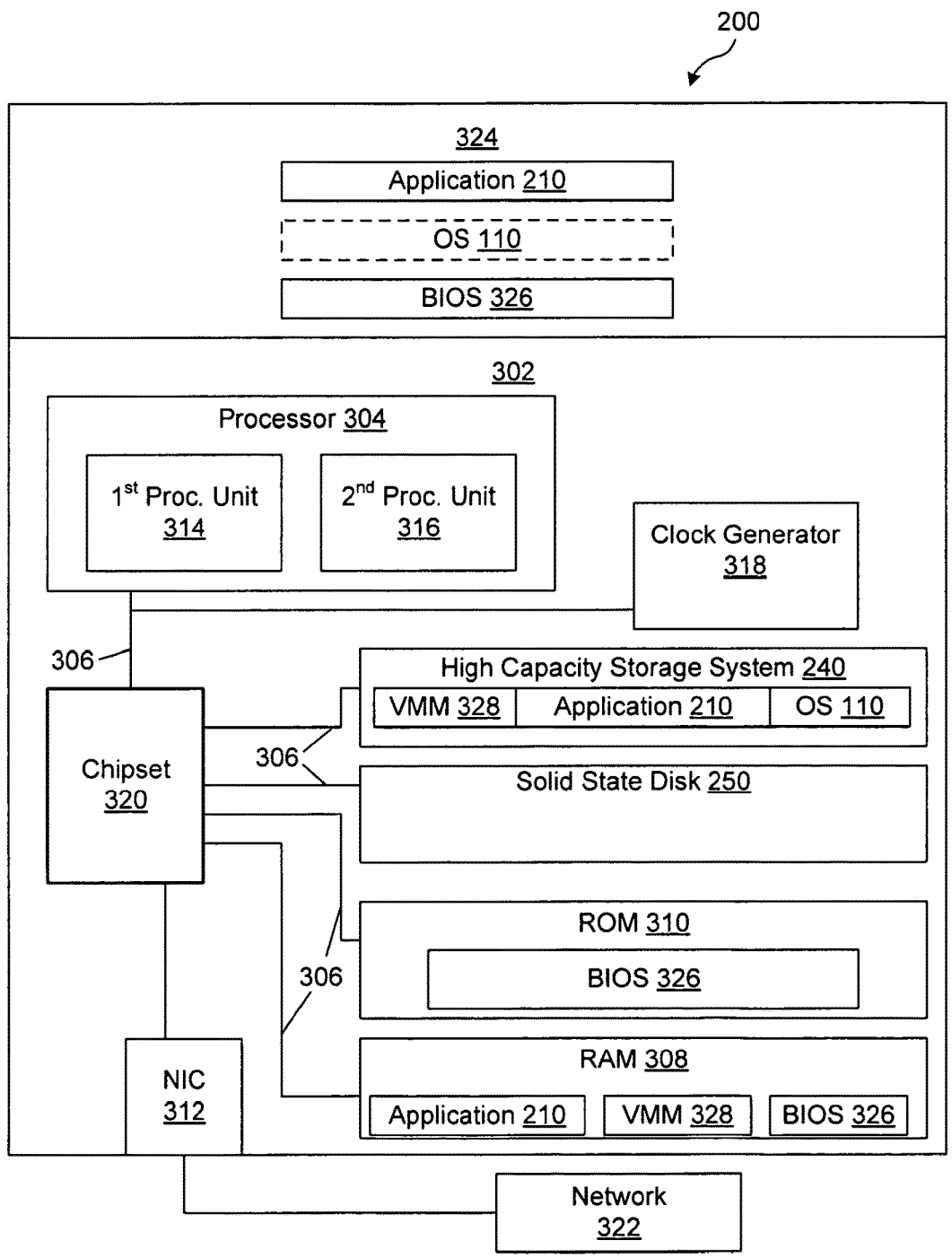
FIG. 3 is a block diagram depicting a platform in which an embodiment of the invention may be implemented.

FIG. 3 is a block diagram depicting a platform 200 in which an embodiment of the invention may be implemented. Platform 200 may be a mobile station or a relatively fixed system with various hardware components 302 such as a processor 304, referred to here as a host or central processing unit (CPU) communicatively coupled to various other components via one or more system buses 306 or other communication pathways or mediums. For example, processor 304 may be communicatively coupled to one or more volatile or nonvolatile data storage devices (e.g., RAM 308, ROM 310, and one or more high capacity storage systems 240). Processor 304 may also be communicatively coupled to one or more network interface controllers (NICs) 312, video controllers, integrated drive electronics (IDE) controllers, small computer system interface (SCSI) controllers, universal serial bus (USB) controllers, input/output (I/O) ports, input devices, output devices such as a display, etc.

In the embodiment of FIG. 3, processor 304 includes a first processing unit 314 and a second processing unit 316. Alternatively, the platform 200 may include a processor 304 with one processing unit, or multiple processors, each having at least one processing unit. In systems with multiple processing units, those processing units may be implemented as processing cores, as Hyper-Threading (HT) technology, or as any other suitable technology for executing multiple threads simultaneously or substantially simultaneously.

In this embodiment, platform 200 is configured to track real-time using a real-time clock and includes a clock generator 318. The clock generator 318 may be a circuit, comprising a resonant circuit and an amplifier, producing a timing signal for use in synchronizing operation of a platform 200. The timing signal from the clock generator 318 may be a simple symmetrical square wave or it may have a more complex waveform. In the embodiment of FIG. 3, the clock generator 318 is a discrete module that is communicatively coupled to processor 304 via the system bus 306. Alternatively, the clock generator 318 may be coupled to the processor 304 through the chipset 320 or the clock generator 318 may be a part of the processor 304 (not shown).

Chipset 320 may include one or more bridges or hubs for communicatively coupling system components, as well as other logic and storage components. The solid state disk (SSD) 250 of FIG. 2 may also be communicatively coupled to processor 304 via the system bus 306 and/or the solid state disk 250 may be coupled to the platform 200 through a port such as a USB or serial ATA port. The SSD 250 may further have a host driver that already has access to a system time. In another embodiment (not shown), the SSD 250 may replace the high capacity storage system 240.

Some components may be implemented as adapter cards with interfaces (e.g., a PCI connector) for communicating with a bus. In one embodiment, one or more devices may be implemented as embedded controllers, using components such as programmable or non-programmable logic devices or arrays, ASICs, embedded computers, smart cards, and the like. For purposes of this discussion, the term "ROM" may be used in general to refer to nonvolatile memory devices such as erasable programmable ROM (EPROM), electrically erasable programmable ROM (EEPROM), flash ROM, flash memory, etc. Also, the term "bus" refers to shared communication pathways, as well as point-to-point pathways.

Platform 200 may be controlled, at least in part, by input from conventional input devices, such as a keyboard, a mouse, etc., and/or by directives received from another machine, biometric feedback, or other input sources or signals. Platform 200 may utilize one or more connections to one or more remote data platforms through a network 322, such as through NIC 312, a modem, or other communication ports or couplings. Platforms 200 may be interconnected to form a data processing environment through use of the physical and/or logical network 322, such as a local area network (LAN), a wide area network (WAN), an intranet, the Internet, etc. Communications involving the network 322 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as worldwide interoperability for microwave access (WiMAX) or wireless metropolitan area network (WirelessMAN) protocols, and information concerning those protocols is currently available at grouper.ieee.org/groups/802/16/index.html.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a platform 200, perform a desired operation or operations. The programs in platform 200 may be considered components of a software environment 324.

For instance, when platform 200 boots, a BIOS 326 may be loaded into RAM 308 and executed within software environment 324. Platform 200 may also load and run a VMM 328 and/or one or mode OSs 110 within software environment 324. For example, if platform 200 has not been configured for virtualization, VMM 328 may be unnecessary, and applications may run on top of OS 110. In other embodiments, VMM 328 may launch various guest OSs and user applications in separate virtual machines within software environment 324.

FIG. 4 is an embodiment of a command packet 400 or data packet used to communicate a timestamp in which an embodiment of the invention may be implemented. The command packet 400 for communicating a timestamp may be a non-queuing formatted command for reduced complexity or, alternately, a queuing formatted command such as an ATA or serial ATA (SATA) command that embeds a timestamp directly in the command packet 400 itself without explicitly requiring that extra data packets be included. Here, a generic non-data command, formatted as command code 64$h$, is defined with a register set 410 and a feature register 420 to flag a function of the command packet 400. Bit 7 ($t$) 415 in this embodiment may be set to a value of one to indicate that the command packet 400 is being used to communicate a timestamp to the solid state disk 250. The operating system 110 may determine whether the command packet 400 is to be flagged and flag the command packet 400 to indicate that the command packet 400 comprises the timestamp, in response to determining that the command packet 400 is to be flagged.

According to the format of FIG. 4, the command packet 400 is used for other functions while allowing for other flag values to be reserved in bits 6:0 of the feature register 420. Identifying the command packet 400 as a timestamp allows a timestamp to be entered in a first field 430 and a second field 440 of the command packet 400. A TAG value 445 as defined in the Sector Count 450 is consistent with the existing field definition for a SATA native command queuing (NCQ) command, thereby allowing the NCQ command to execute while other commands are outstanding at the solid state disk 250. The command packet 400 may also be characterized by an embedded command type 470.

Figure 5:
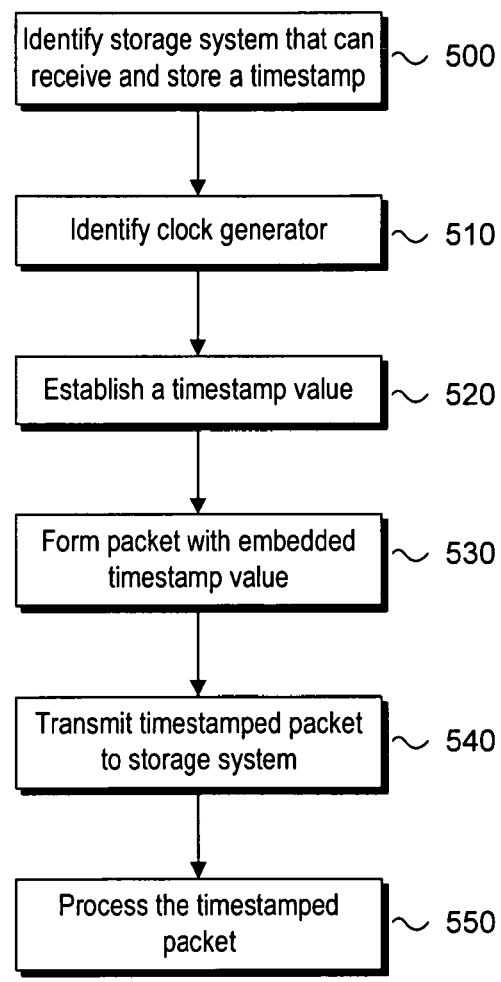
FIG. 5 is a flowchart that describes a method for communicating a timestamp to a storage system.

FIG. 5 is a flowchart that describes a method for communicating a timestamp to a storage system in which an embodiment of the invention may be implemented. In element 500, the platform 200 identifies one or more storage systems 100, such as a solid state disk 250 that can receive and process a timestamp, such as by storing the timestamp or recognizing the timestamp to update a lifecycle budget. A lifecycle budget may simply be an allocated life for a SSD 250, represented by a time measurement or a similar parameter.

For example, receiving and processing a timestamp may be accomplished under the definition of IDENTIFY DEVICE or IDENTIFY PACKET DEVICE. In one embodiment, the timestamp is a 64-bit value based on a reference signal according to an established unit of time, such as a unit of time with micro-second granularity. In another embodiment, the timestamp is a real-time value correlated with a date and/or date and time. In a further embodiment, the timestamp is a time delta representing a time difference between two instances in time.

The platform 200 identifies a clock generator 318 to provide a reference signal in element 510. A timestamp is established based upon the reference signal in element 520 and a command packet 400 or data packet is formed with a timestamp embedded in the command packet 400 (element 530). The timestamp with a timestamp value may be established on a periodic basis, on a programmed basis, or in response to a trigger such as an event. Further, the operating system 110 may first determine whether the event is to be timestamped and timestamping the event with the timestamp value in response to determining that the event is to be timestamped.

A timing of when and how often a timestamp would be communicated to one or more storage systems may be triggered by a single instance, such as a power-on event, a power-down event, or it may be a known recurrence based on run-time system events or timers. The timestamp may be a single time value and/or the timestamp may be a change in time between two time values, resulting in a time delta. The time delta may be transmitted to the storage system 100 to inform the storage system 100 of how much time has elapsed while the storage system 100 was powered off, in hibernation, in standby mode, or otherwise in an idle mode.

In a preferred embodiment, the timestamp is provided to track an amount of time that has elapsed while the solid state disk 250 is powered off. For example, the platform 200 may timestamp the event according to an established policy such as communicating a timestamp upon every time cycle. A storage location is identified in the storage system(s) such as the solid state disk 250 and the command packet 400 with the embedded timestamp is transferred to the solid state disk 250 in element 540. The timestamped command packet 400 is processed by the solid state disk 250. Alternately, each command packet 400 may be stored in the solid state disk 250 in a protected location. Further, each command packet 400 may be erased, and/or overwritten by another command packet 400 or other data.

An alternate method for communicating a timestamp to a storage system such as the solid state disk 250 may be to use a communication channel utilizing log pages. One or more ATA protocols including Self Monitoring Analysis and Reporting Technology (SMART), General Purpose Logging, SMART Command Transport (SCT) may be used for obtaining or storing data within the storage system through assigned or reserved log page locations. Typically, a specific log page address is 512 bytes in length. The timestamp may use the entire log page or only a portion of the log page to store the timestamp. Communicating the timestamp may be performed through a write command such as WRITE LOG EXT or WRITE LOG DMA EXT through a defined protocol using an assigned log page register.

The operation discussed herein may be generally facilitated via execution of appropriate firmware or software embodied as code instructions on the host processor 304 and microcontroller, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
receiving, by a non-volatile memory storage device, a packet from a computing platform coupled with the non-volatile memory storage device;
processing the packet to use a timestamp included in the packet to determine a time during which the non-volatile memory storage device has been in a powered-down state; and
using the determined time during which the non-volatile memory storage device has been in the powered-down state to calculate a remaining useful life of memory elements included in the non-volatile memory storage device.

2. The method of claim 1, the powered-down state comprising a powered-off state, a hibernation state, a standby mode or otherwise idled state.

3. The method of claim 1, comprising the packet sent by the computing platform based on a power-on event or a power-down event.

4. The method of claim 1, the timestamp comprising a time delta.

5. The method of claim 4, comprising the time delta indicating a time that has elapsed while the non-volatile memory storage device was in the powered-down state.

6. The method of claim 1, comprising:
storing the packet in a storage location at the non-volatile memory storage device.

7. The method of claim 6, comprising storing the packet in the storage location using a log page.

8. The method of claim 1, the packet comprises a command packet.

9. The method of claim 1, the memory elements comprising one or more NAND flash memory devices or one or more phase change memory devices.

10. A non-volatile memory storage device comprising:
one or more memory elements; and
a controller to:
receive a packet from a computing platform coupled with the non-volatile memory storage device;
process the packet to use a timestamp included in the packet to determine a time during which the non-volatile memory storage device has been in a powered-down state; and
use the determined time during which the non-volatile memory storage device has been in the powered-down state to calculate a remaining useful life of the one or more memory elements.

11. The non-volatile memory storage device of claim 10, the powered-down state comprising a powered-off state, a hibernation state, a standby mode or otherwise idled state.

12. The non-volatile memory storage device of claim 10, comprising the packet sent by the computing platform based on a power-on event or a power-down event.

13. The non-volatile memory storage device of claim 10, the timestamp comprising a time delta.

14. The non-volatile memory storage device of claim 10, comprising a time delta to indicate a time that has elapsed while the non-volatile memory storage device was in the powered-down state.

15. The non-volatile memory storage device of claim 10, comprising:
   storing the packet in a storage location at the non-volatile memory storage device.

16. The non-volatile memory storage device of claim 15, comprising storing the packet in the storage location using a log page.

17. The non-volatile memory storage device of claim 10, the packet comprises a command packet.

18. The non-volatile memory storage device of claim 10, the memory elements comprising NAND flash memory devices or phase change memory devices.

19. A method comprising:
   detecting, at a host, a trigger to communicate a timestamp;
   generating a command packet that includes the timestamp;
   flagging the command packet to indicate that the command packet includes the timestamp;
   identifying a non-volatile memory storage device coupled with the host to receive the command packet; and
   causing the command packet to be sent to the non-volatile memory storage device for the non-volatile memory storage device to determine a time during which the non-volatile memory storage device has been in a powered-down state and use the determined time to calculate a remaining useful life of memory elements included in the non-volatile memory storage device.

20. The method of claim 19, the trigger comprising a power-on event or a power-down event.

21. The method of claim 19, the powered-down state comprising a powered off state, a hibernation state, a standby mode or otherwise idled state.

22. The method of claim 19, the timestamp comprising a time delta.

23. The method of claim 19, comprising:
   allocating a protected location in the non-volatile memory storage device;
   and causing the timestamp to be stored to the protected location.

24. The method of claim 23, comprising:
   causing the timestamp to be stored in the protected location using a log page.

25. At least one non-transitory machine readable medium comprising a plurality of instructions that in response to being executed by a host of a computing platform, cause the host to:
   detect a trigger to communicate a timestamp;
   generate a command packet that includes the timestamp;
   flag the command packet to indicate that the command packet includes the timestamp;
   identify a non-volatile memory storage device coupled with the host to receive the command packet; and
   cause the command packet to be sent to the non-volatile memory storage device for the non-volatile memory storage device to determine a time during which the non-volatile memory storage device has been in a powered-down state and use the determined time to calculate a remaining useful life of memory elements included in the non-volatile memory storage device.

26. The at least one non-transitory machine readable medium of claim 25, the trigger comprising a power-on event or a power-down event.

27. The at least one non-transitory machine readable medium of claim 25, the powered-down state comprising a powered-off state, a hibernation state, a standby mode or otherwise idled state.

28. The at least one non-transitory machine readable medium of claim 25, the timestamp comprising a time delta.

29. The at least one non-transitory machine readable medium of claim 25, comprising the instructions to further cause the host to:
   allocate a protected location in the non-volatile memory storage device;
   and cause the timestamp to be stored to the protected location.

30. The at least one non-transitory machine readable medium of claim 29, comprising the instructions to further cause the host to:
   cause the timestamp to be stored in the protected location using a log page.

* * * * *